United States Patent

Rangwala et al.

[11] Patent Number: 5,841,562
[45] Date of Patent: Nov. 24, 1998

[54] BIDIRECTIONAL MODULAR OPTOELECTRONIC TRANSCEIVER ASSEMBLY

[75] Inventors: Sabbir S. Rangwala; Thomas Stanley Stakelon, both of Allentown, Pa.

[73] Assignee: Lucent Technologies, Inc., Murray Hill, N.J.

[21] Appl. No.: 968,958

[22] Filed: Nov. 12, 1997

Related U.S. Application Data

[63] Continuation of Ser. No. 756,218, Nov. 25, 1996, abandoned.

[60] Provisional application No. 60/009,337 Dec. 28, 1995.

[51] Int. Cl.[6] .................................................. H04B 10/24
[52] U.S. Cl. ............................................. 359/152; 385/92
[58] Field of Search ..................................... 359/152, 153, 359/161, 163; 385/88–90, 92–93

[56] References Cited

U.S. PATENT DOCUMENTS

| | | | |
|---|---|---|---|
| 4,118,105 | 10/1978 | Voigt | 350/96.2 |
| 4,199,222 | 4/1980 | Ikushima et al. | 350/96.19 |
| 5,127,075 | 6/1992 | Althaus et al. | 385/92 |
| 5,222,170 | 6/1993 | Bargar et al. | 385/88 |
| 5,347,605 | 9/1994 | Isaksson | 385/92 |
| 5,621,573 | 4/1997 | Lewis et al. | 359/634 |

FOREIGN PATENT DOCUMENTS 55-0091243  7/1980  Japan ..................... 359/114

*Primary Examiner*—Leslie Pascal
*Attorney, Agent, or Firm*—Lester H. Birnbaum

[57] ABSTRACT

A bidirectional optoelectronic transceiver assembly comprises a pair of interconnectable modules. One module houses a laser diode and a lens; the other a photodiode, a beam splitter and a fiber pigtail.

3 Claims, 3 Drawing Sheets

BIDIRECTIONAL MODULAR OPTOELECTRONIC TRANSCEIVER ASSEMBLY

This application is a Continuation of Application Ser. No. 08/756,218 filed Nov. 25, 1996 now abandoned.

CROSS-REFERENCE TO RELATED APPLICATION

This application claims priority of Provisional Application Ser. No. 60/009,337 which was filed on Dec. 28, 1995.

BACKGROUND OF THE INVENTION

This invention relates to bidirectional fiber optic communication systems and, more particularly, to a transceiver assembly for use in such systems.

In a typical bidirectional fiber optic communication system, such as a fiber-in-the-loop (FITL) system, optical signals propagate in both directions over a signal optical fiber. Terminal equipment at each end of the fiber includes a transceiver which launches an outgoing optical signal onto the fiber and which receives an incoming signal from the same fiber. Generally, within the transceiver assembly the outgoing and incoming optical signals are directed over separate optical paths between the fiber and either a light source (e.g., laser diode) and a light detector (e.g., photodiode). Various transceiver arrangements are known in the art for performing this function, but they are assembled from discrete components in a non-modular fashion. As a consequence, alignment of the various components is extremely difficult and time consuming, especially alignment of the laser diode to the fiber which must be done to very tight tolerances of about 1–2 $\mu$m.

Thus, a need remains in the art for a modular transceiver assembly which alleviates alignment problems and, therefore, is more easily manufactured.

SUMMARY OF THE INVENTION

In accordance with one aspect of the invention, a transceiver comprises a transmitter module and a receiver-splitter module which is plugged into a self-aligning socket of the transmitter module. In one embodiment, the transmitter module includes a light source lensed to an opening in the socket, and the receiver-splitter module includes a ferrule which is plugged into the socket. The ferrule carries an optical fiber so that one end of the fiber is optically coupled to the light source. This coupling enables an outgoing optical signal to be partially transmitted to a fiber pigtail located at the opposite end of the ferrule. A splitter is located at the other end of the fiber so that an incoming optical signal on the fiber pigtail is partially reflected to a light detector.

BRIEF DESCRIPTION OF THE DRAWINGS

The invention, together with its various features and advantages, can be readily understood from the following more detailed description taken in conjunction with accompanying drawing, in which.

DETAILED DESCRIPTION

Figure 1:
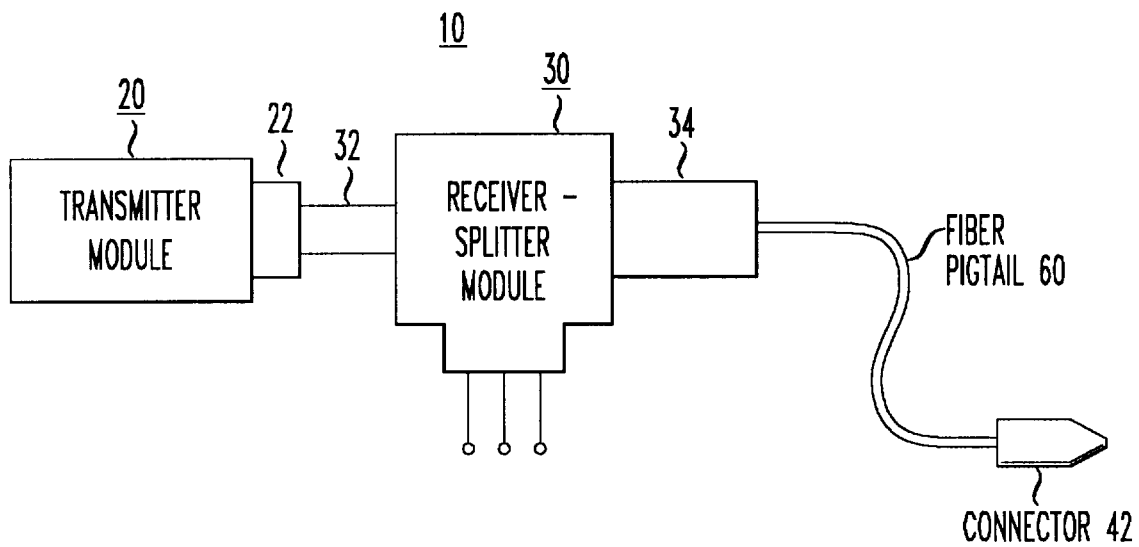
FIG. 1 is a schematic drawing showing a transceiver assembly in accordance with one aspect of the invention.

With reference now to FIG. 1, a transceiver assembly 10 comprises a transmitter module (T-module) 20 and a receiver-splitter module (RS-module) 30. The latter includes a fiber-carrying first ferrule 32 which is plugged into a socket 22 of the T-module 20, thereby to effect optical coupling between the two modules. In addition, the RS-module includes a fiber-carrying second ferrule 34 to effect optical coupling to an optical fiber such as, for example, a fiber pigtail 60. The pigtail is shown to be terminated in a connector 42, illustratively in a biconic male connector. Other types of connectors, such as well-known ST, FC or SC connectors, are also suitable, however.

Figure 3:
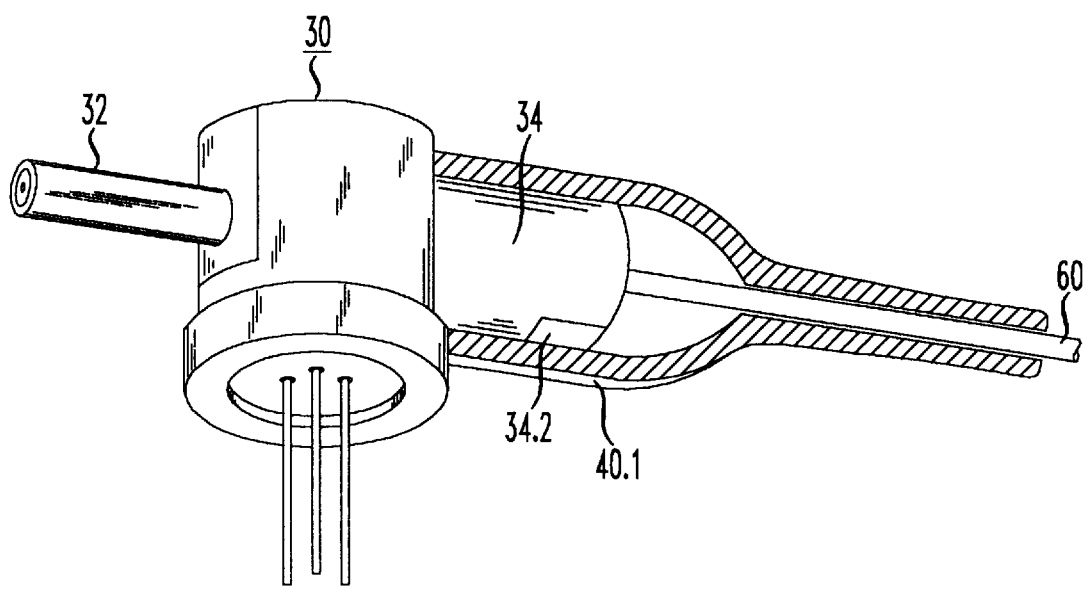
FIG. 3 is an isometric view of the receiver-splitter module of FIG. 2, with the strain-relief member in cross-section to expose the ferrule 34.
Figure 2:
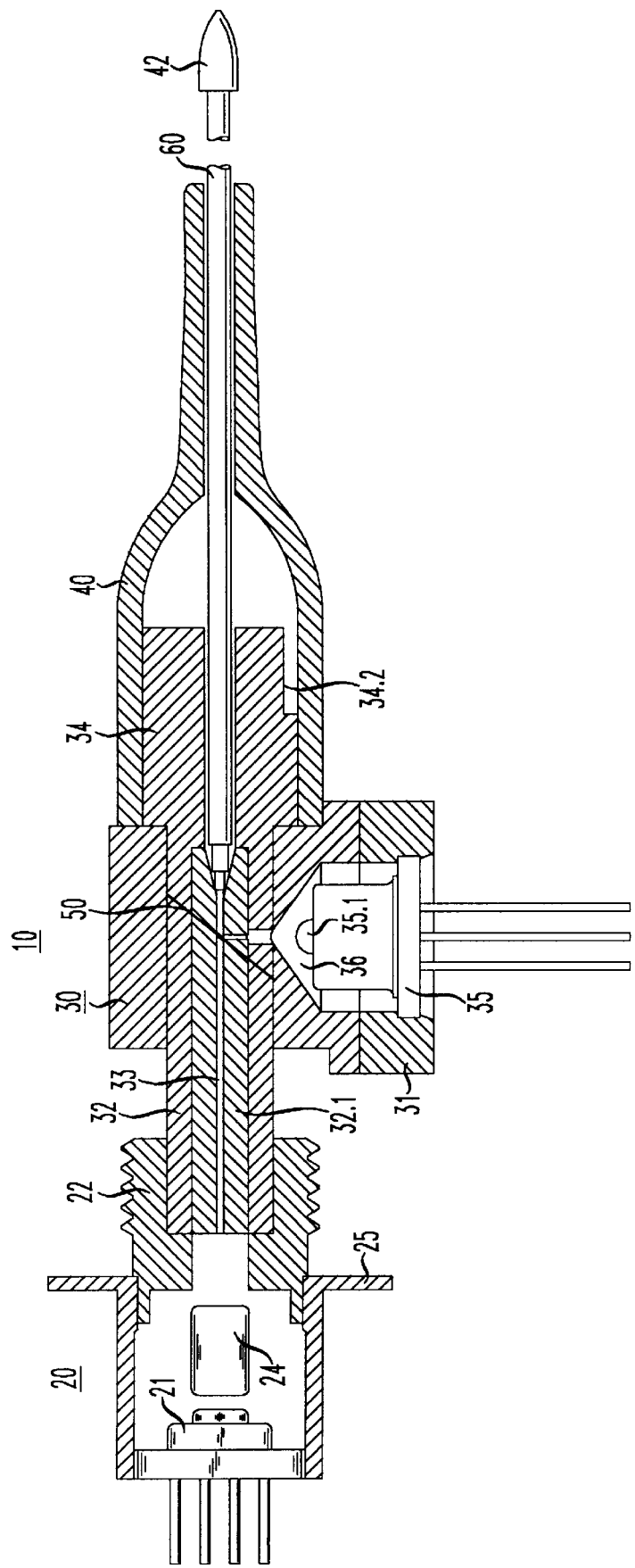
FIG. 2 is a partial cross-sectional view of an illustrative transceiver module, including a transmitter module coupled to a receiver-splitter module, in accordance with one embodiment of the invention.
Figure 4:
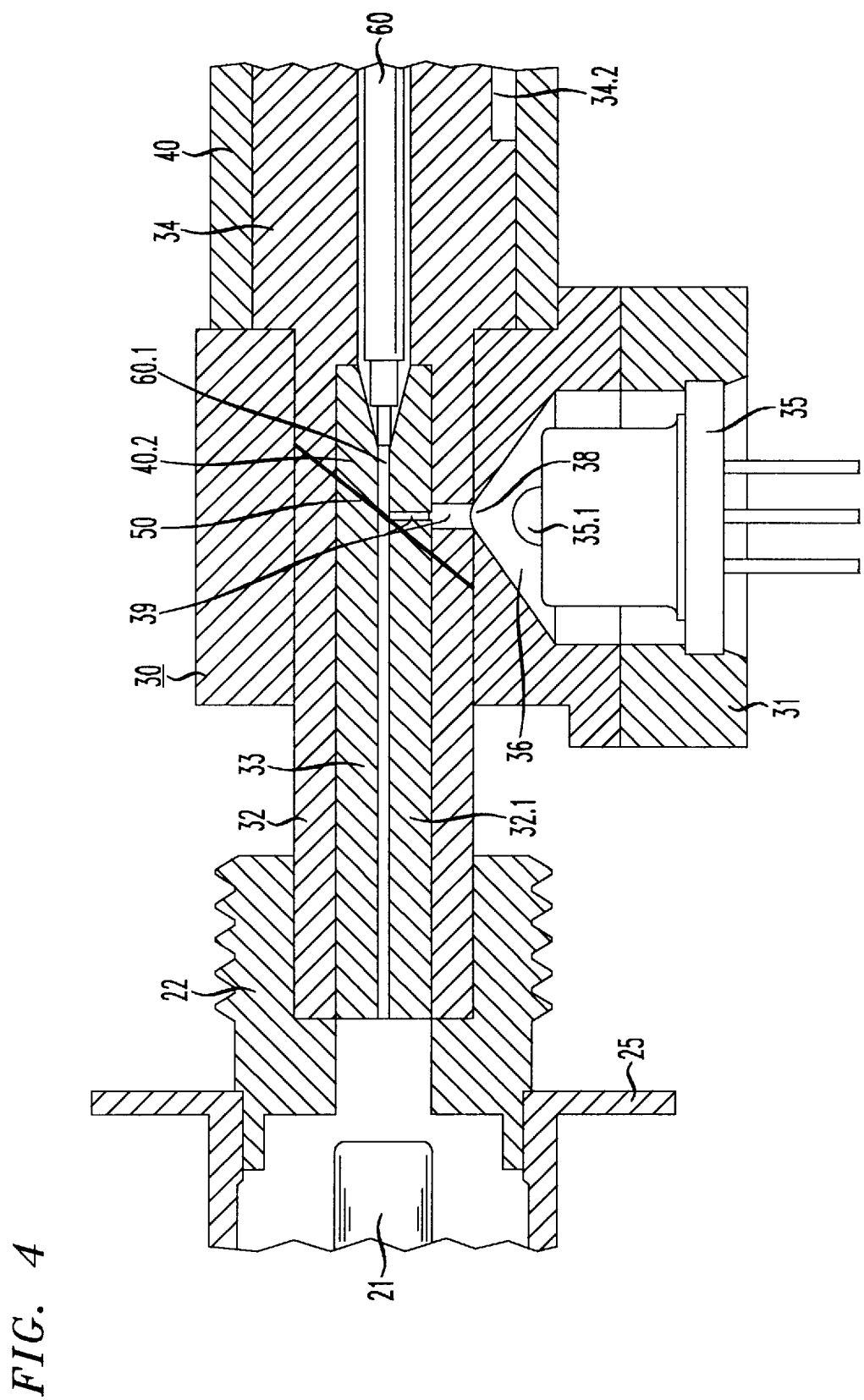
FIG. 4 is an enlarged view of a portion of FIG. 3.

The transceiver assembly 10 is shown in greater detail in the cross-sectional views of FIG. 2 and FIG. 4 and in the isometric view of FIG. 3. T-module 20 comprises a light source package 21, including for example a laser diode (not shown), which is mounted at one end of housing 25. A suitable lens, such as a GRIN rod lens 24, is mounted near an opening at the opposite end of housing 25. Other suitable lens designs include a single-ball lens, a single asphere lens, or a confocal two-ball lens arrangement, all of which are well known in the art. Socket 22 has a cylindrical bore which is coaxial with lens 24 and which is adapted to receive ferrule 32. The lens 24 focuses the light beam from laser diode 21 through the opening and images it onto the end of a stripped (e.g. bare) fiber 33 when ferrule 32 is plugged into socket 22. The fiber 33 is typically surrounded by a glass tube 32.1 within ferrule 32.

The typical tight alignment tolerances of about 1–2 $\mu$m demanded by the small size of the active region of the laser diode is accommodated in the positioning of lens 24 relative to the laser diode during manufacture of the T-module 20. Once their relative position is fixed, the primary alignment problem that remains is to align the photodetector to the splitter, but that is much more forgiving (e.g., tolerances of about 10 $\mu$m are typical).

The RS-module 30 comprises a central housing 31 having a cavity 36 adapted to receive a photodiode package 35. Optical signals are coupled to the photodiode itself (within package 35 but not shown) via lens 35.1. Illustratively, the photodiode package is maintained within the cavity by a pressure fit. The housing 31 also has a lateral bore adapted to receive the first ferrule 32 into one end and the second ferrule 34 into the opposite end. The cavity 36 and the lateral bore have an aperture 38 (FIG. 4) which places them in optical communication with one another. In addition, the ferrule 32 has a channel 39, transverse to its longitudinal (fiber) axis, that communicates with aperture 38.

Within the RS-module, the second ferrule 34 has a somewhat larger bore than ferrule 32, sufficiently large to receive a fiber pigtail 60. An end portion 60.1 of the pigtail is stripped and positioned within a glass tube 60.2. A conical opening at one end of tube 60.2 serves to align the fiber pigtail when it is inserted into coupler 34.

Pigtail 60 is attached to ferrule 34 via a cylindrical strain-relief member 40. The inside cylindrical surface of member 40 is attached to the outside cylindrical surface of ferrule 34. The flat 34.2 is a registration feature which serves to facilitate alignment of ferrule 34 to the photodetector.

In one embodiment of the splitter function, the interior ends of ferrules 32 and 34 each have oblique surfaces 50 oriented at about 45° and parallel to one another. Likewise the interior ends of the fiber 33 and the fiber end portion 60.1 also have oblique surfaces oriented at about 45%. A reflection/transmission coating is formed on oblique fiber surfaces. The coating is typically a well-known multilayered coating in which the layer thicknesses and materials are adopted so that 25 an incoming optical signal from fiber pigtail 60 is directed (e.g., reflected) through channel 39 and aperture 38 to lens 35.1. The latter focuses the signal onto the photodiode in package 35. On the other hand, an outgoing signal from T-module 20 is partially transmitted through the coating into fiber pigtail 60.

In operation, an outgoing optical signal from the laser diode is coupled through lens 24 into bare fiber 33. A portion (e.g., about half) of the signal is transmitted through splitter 39 into pigtail fiber 60. Pigtail 60 is coupled via connector 42 to first utilization means (not shown) such as a transmission fiber for communicating the signal to terminal equipment. The remaining portion of the outgoing signal is reflected upward from splitter 39 away from the photodetector. It is, therefore, wasted energy. In the reverse (incoming) direction, an incoming optical signal on pigtail 60 is incident on splitter 39. A portion (e.g., about half) of the energy is directed (reflected) downward to the photodetector, where it is converted to an electrical signal which in turn is supplied to second utilization means (not shown). The remaining portion of the incoming signal is transmitted through the splitter 39 into bare fiber 33. Although some of the incoming radiation which is coupled to fiber 33 will be incident on the laser diode, an optical isolator is not essential when the transceiver module is used in either a half-duplex (e.g., burst mode) single wavelength system, or if it is used in a dual wavelength system.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

We claim:

1. A transceiver assembly comprising:

a transmitter module including a housing, a source of an outgoing optical signal mounted in a wall of said housing, an aperture in a wall of said housing, a socket including a cylindrical bore disposed within said aperture, and a lens for coupling said outgoing signal through said aperture, and a receiver-splitter module having a cavity and a transverse bore optically coupled thereto, a detector of an incoming optical signal mounted in said cavity, a first ferrule having a flat first endface and an opposite oblique endface, said first ferrule containing a fiber segment, the fiber segment having a first flat endface coplanar with said first ferrule flat first endface and having an oblique endface coplanar with said first ferrule oblique endface wherein the fiber segment oblique endface includes a coating adapted to partially transmit said outgoing signal and to partially reflect said incoming signal into said detector, the flat first endface of said first ferrule being insertable into said socket cylindrical bore so that said fiber segment receives said outgoing signal, and a second ferrule having an oblique first endface and an opposite flat endface, said second ferrule containing a fiber segment, the fiber segment having a first oblique endface coplanar with said second ferrule first oblique endface including a coating adapted to partially transmit said outgoing signal and to partially reflect said incoming signal into said detector, the oblique endfaces of said first and second ferrules being insertable into the receiver-splitter transverse bore such that the respective oblique faces are parallel to one another and the respective coatings are in physical contact and disposed in optical alignment with the detector disposed within the receiver-splitter cavity.

2. The assembly of claim 1 wherein said incoming and outgoing signals have essentially the same wavelength.

3. The assembly of claim 1 wherein the oblique endfaces of the first and second ferrules are formed to comprise an angle of approximately 45° with respect to the cylindrical bore of the socket.

\* \* \* \* \*